United States Patent
Merville et al.

(10) Patent No.: US 9,677,404 B2
(45) Date of Patent: Jun. 13, 2017

(54) ONE-BLOCK BLADED DISK PROVIDED WITH BLADES WITH ADAPTED FOOT PROFILE

(71) Applicant: SNECMA, Paris (FR)

(72) Inventors: Didier Merville, Breuillet (FR); Lucie Galons, Paris (FR); Vincent Perrot, Maisons Alfort (FR); Hanna Reiss, Pontault-Combault (FR)

(73) Assignee: SNECMA, Paris (FR)

( * ) Notice: Subject to any disclaimer, the term of this patent is extended or adjusted under 35 U.S.C. 154(b) by 433 days.

(21) Appl. No.: 14/348,770

(22) PCT Filed: Oct. 8, 2012

(86) PCT No.: PCT/FR2012/052280
§ 371 (c)(1),
(2) Date: Mar. 31, 2014

(87) PCT Pub. No.: WO2013/050724
PCT Pub. Date: Apr. 11, 2013

(65) Prior Publication Data
US 2014/0248155 A1    Sep. 4, 2014

(30) Foreign Application Priority Data

Oct. 7, 2011  (FR) .................................... 11 59083

(51) Int. Cl.
*F01D 5/14* (2006.01)
*F01D 5/12* (2006.01)
(Continued)

(52) U.S. Cl.
CPC ................ *F01D 5/12* (2013.01); *F01D 5/14* (2013.01); *F01D 5/141* (2013.01); *F01D 5/34* (2013.01);
(Continued)

(58) Field of Classification Search
CPC ........... F05D 2250/38; F05D 2240/301; F05D 2250/70; F05D 2250/71; F01D 5/145;
(Continued)

(56) References Cited

U.S. PATENT DOCUMENTS 2,754,919 A * 7/1956 Blue ....................... B63H 1/26
416/238
4,131,387 A * 12/1978 Kazin ..................... F01D 5/141
415/119

(Continued)

FOREIGN PATENT DOCUMENTS

EP         1111188 A2 *  6/2001   ............. F01D 5/141
EP      1 505 302 A1     2/2005
(Continued)

OTHER PUBLICATIONS

Smith et al., "Sweep and Dihedral Effects in Axial-flow Turbomachinery". Journal of Basic Engineering, vol. 85, No. 3, pp. 401-416, Sep. 1, 1963, XP000560640.*

(Continued)

*Primary Examiner* — Craig J Price
(74) *Attorney, Agent, or Firm* — Oblon, McClelland, Maier & Neustadt, L.L.P.

(57) ABSTRACT

A one-block bladed disk includes blades, a leading edges of which has sweep and dihedral angles, both strongly variable and increasingly large upon approaching a connection to a hub to improve mechanical strength of the whole and obtain good distribution of gas flow over the height of the blade.

10 Claims, 3 Drawing Sheets

(51) Int. Cl.
*F01D 5/34* (2006.01)
*F04D 29/32* (2006.01)

(52) U.S. Cl.
CPC ...... *F04D 29/324* (2013.01); *F05D 2240/301* (2013.01); *F05D 2250/70* (2013.01); *F05D 2250/71* (2013.01); *Y02T 50/673* (2013.01)

(58) Field of Classification Search
CPC ... F01D 5/148; F01D 5/14; F01D 5/12; F01D 5/34; F01D 5/141; F04D 29/324; Y02T 50/673
USPC ............... 416/223 R, 234, 238, 242, 243
See application file for complete search history.

(56) References Cited

U.S. PATENT DOCUMENTS

| | | | | |
|---|---|---|---|---|
| 5,167,489 | A * | 12/1992 | Wadia | B64C 11/18 415/182.1 |
| 5,190,441 | A * | 3/1993 | Murphy | B64C 11/008 415/119 |
| 6,071,077 | A | 6/2000 | Rowlands | |
| 7,726,937 | B2 * | 6/2010 | Baumann | F01D 5/06 415/191 |
| 8,100,658 | B2 * | 1/2012 | Iida | F04D 29/324 416/223 R |
| 8,647,067 | B2 * | 2/2014 | Pandey | F01D 5/143 416/193 A |
| 8,702,398 | B2 * | 4/2014 | Breeze-Stringfellow | F01D 5/141 416/242 |
| 9,359,064 | B2 * | 6/2016 | Murooka | F01D 5/141 |
| 2003/0031564 | A1 * | 2/2003 | Kawarada | F01D 5/141 416/235 |
| 2005/0031454 | A1 | 2/2005 | Doloresco et al. | |
| 2006/0165520 | A1 * | 7/2006 | Guemmer | F01D 5/141 415/191 |
| 2008/0152505 | A1 | 6/2008 | Burton et al. | |
| 2010/0054946 | A1 | 3/2010 | Orosa et al. | |
| 2010/0260609 | A1 * | 10/2010 | Wood | F01D 5/141 416/223 R |
| 2012/0183411 | A1 * | 7/2012 | Haller | F01D 9/041 416/243 |
| 2012/0244005 | A1 * | 9/2012 | Breeze-Stringfellow | F01D 5/141 416/223 A |
| 2015/0354364 | A1 * | 12/2015 | Gallagher | F01D 5/141 416/223 A |

FOREIGN PATENT DOCUMENTS

| | | | | |
|---|---|---|---|---|
| EP | 1 939 398 | A2 | 7/2008 | |
| EP | 1 939 398 | A3 | 7/2008 | |
| EP | 1939399 | A2 * | 7/2008 | ............ F01D 5/141 |
| EP | 2199543 | A2 * | 6/2010 | ............ F01D 5/141 |

OTHER PUBLICATIONS

International Search Report issued Jan. 18, 2013, in PCT/FR12/052280 filed Oct. 8, 2012.
U.S. Appl. No. 14/361,594, filed May 29, 2014, Perrot, et al.

* cited by examiner

ONE-BLOCK BLADED DISK PROVIDED WITH BLADES WITH ADAPTED FOOT PROFILE

DESCRIPTION

The subject matter of the invention is a one-block bladed disk, the blades of which have an adapted foot profile.

As such disks, often abbreviated as <<blisk>>, comprise a circle of blades in one piece with a rotor core and are now currently used in aircraft turbine engines, conjointly with stages of conventional blades wherein the blades are manufactured separately from the rotor and assembled thereto by imbrication of their feet in grooves cut in the surface of the latter.

There exists a large number of blade profiles designed for giving good aerodynamic performances or good mechanical strength for withstanding forces and vibrations. The existing examples are not however necessarily applicable to one-block bladed disks, which are subject to particular stresses notably because of complete and immediate transmission of the stresses between the hub and the blades; this remark is all the more valid since the engine to which belongs the disk will have strong thrust.

The object of the invention is the improvement of one-block bladed disks as regards resistance to static and vibratory forces, to impacts upon occurrence of ingestion of solid bodies into the engine, and distribution uniformity of the gas flow over the height of the blades. It is particularly appreciable for engines operating under intense conditions as such as supersonic flight with a Mach number of for example 1.45 at the intake of the engine, a strong thrust demanding a hub ratio, equal to the radius of the hub over the external radius of the disk, of 0.4 for example and a small elongation defined by the height-over-chord ratio, which may be equal to 1.75.

Documents U.S. 2010/0054946 A and EP 1 505 302 A describe blades having a sweep or dihedral angle continuously increasing towards the hub in a foot area of the blade, but often over a small height of this foot area, and the increment values are generally very small, too small for having a perceivable effect. These prior documents truly are rather interested in the characteristics of the blades at their outer portion, opposite to the foot area to which they pay very little attention.

In a general form, the invention is characterized in that the blades in a foot area adjacent to the hub have a sweep or dihedral angle having continuously increasing values both by at least 10° upon approaching the hub. It was seen that this arrangement improved the blade for aerodynamic performances and its mechanical strength. The time-dependent change in the sweep angle has a more pronounced effect on the first characteristic and the dihedral angle on the second, but without being able to really disassociate them.

The foot area extends over about 20% to 30% of the height of the blade.

Preferred embodiments of the invention have secondary characteristics which will be detailed below, the effect of which is generally to reinforce the main effect of the mentioned angle.

The sweep angle and the dihedral angle have continuously decreasing values in a median area adjacent to the foot area.

The dihedral angle is always negative, except for a portion of the foot area which is closest to the hub.

The sweep angle has always positive values in a median area of the blades adjacent to the foot area, although decreasing towards the foot area, and has values greater than all those of the median area in a portion of the foot area which is the closest to the hub.

In this case, the sweep angle favorably attains a maximum value of at least twice the values in the median portion at the connection to the hub, which may be of at least 20°.

The portion of the foot area for which the dihedral angle is positive extends over about 5% to 10% of the height of the blade, while the portion defined earlier regarding the sweep angle extends over about 10% to 20% of the height of the blade.

The invention also relates to a turbine engine comprising this one-block bladed disk, notably as a compressor fan located fully upstream from a gas stream flowing through it.

The invention will now be described in more detail in connection with the following figures, which represent certain embodiments thereof, purely as an illustration:

Figure 4:
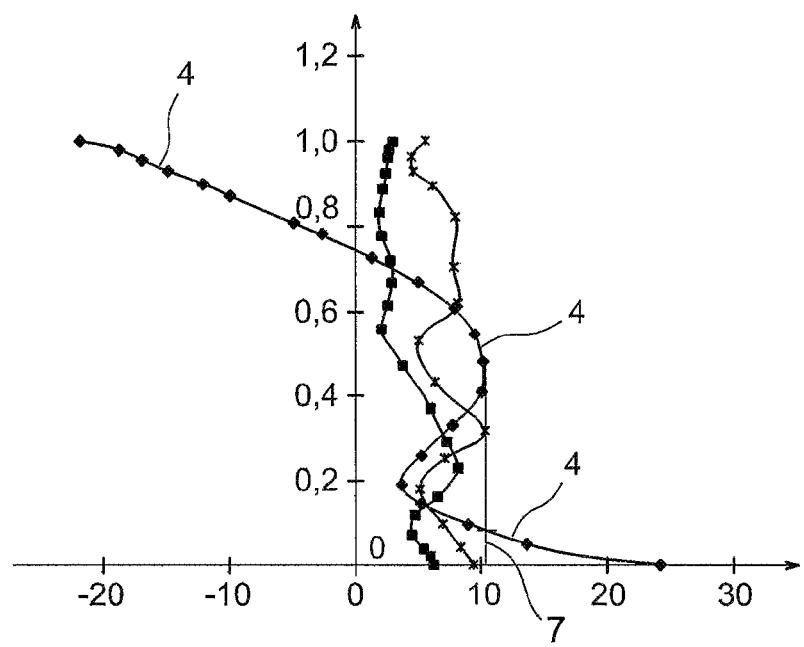
Figure 5:
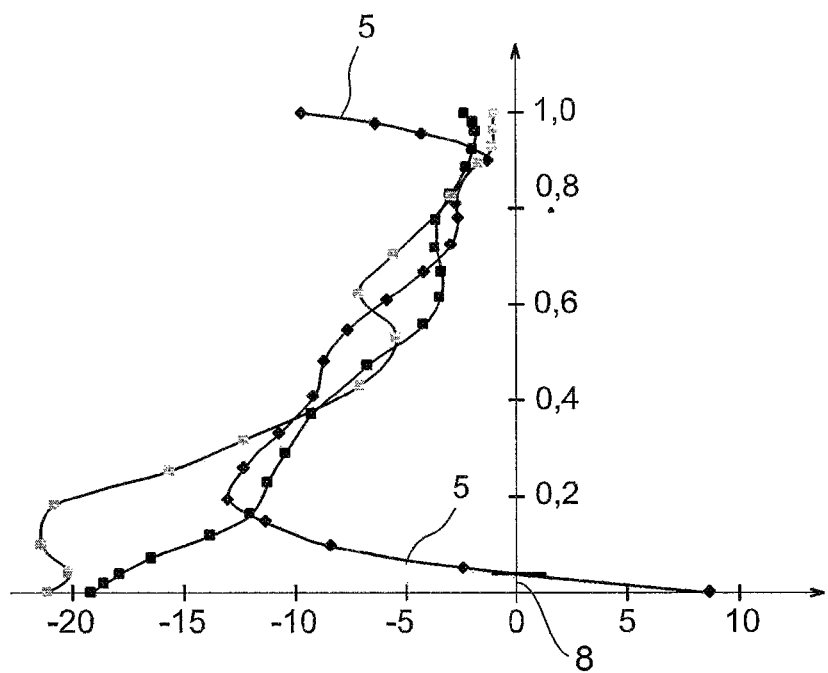
Figure 8:
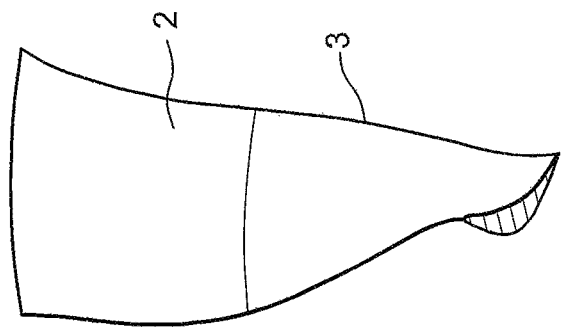
Figure 7:
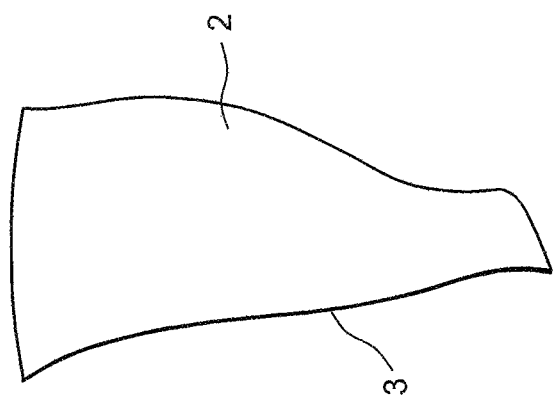
Figure 6:
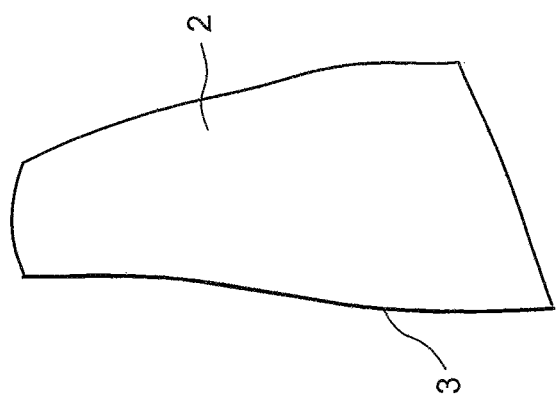

FIGS. 4 and 5 give curves of typical angles of the invention, and FIGS. 6, 7 and 8 are three illustrative views of a blade.

Figure 1:
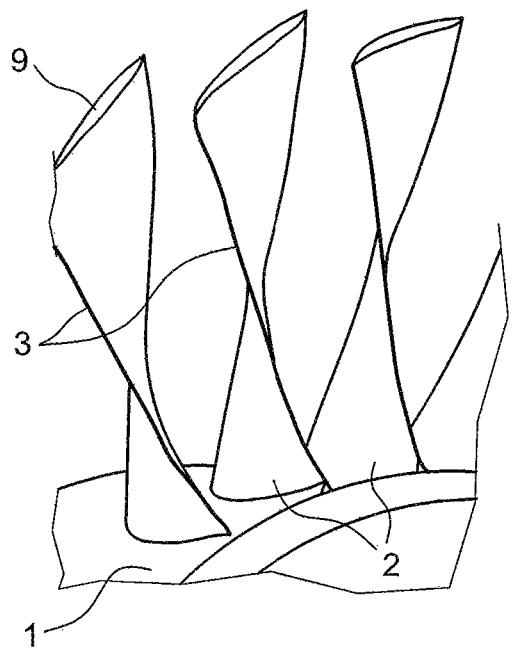
FIG. 1 is a general view of a one-block bladed disk.

FIG. 1 partly represents a one-block bladed disk, consisting of a hub (1), in one piece with a circle of blades (2) distributed on its perimeter. Such a disk may replace an ordinary stage of rotating blades in a turbine engine, and it may be contemplated to place it as a fan at the intake of the engine, as a first stage of a low-pressure compressor.

Figure 2:
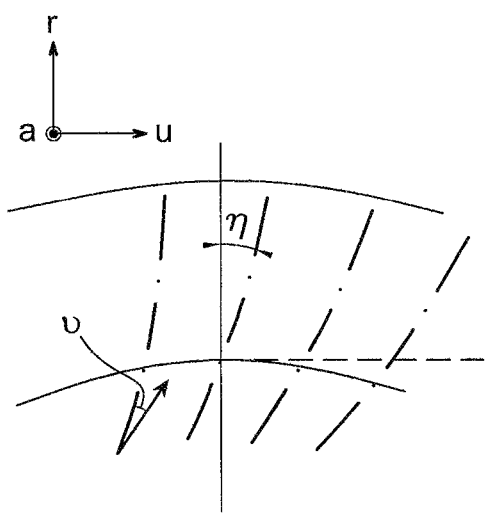
FIGS. 2 and 3 illustrate the meanings of sweep, dihedral angle.
Figure 3:
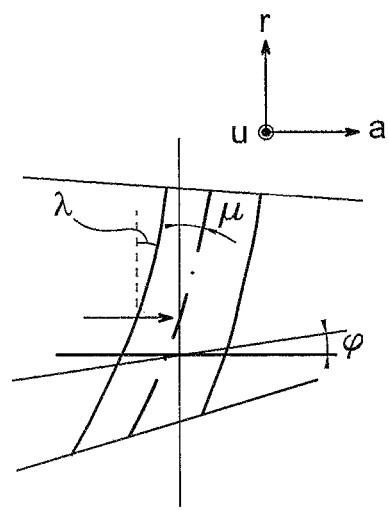

We will be concerned with the so-called sweep and dihedral angles of the blades (2) at their leading edge. These angles measure the differences of the directions between the flow and the blades (2), respectively projected onto a radial and axial plane and an axial plane tangent to the direction of rotation of the engine. They may be expressed, according to the notations of FIGS. 2 and 3, by the following equations, wherein $\lambda$ refers to the sweep angle, $\nu$ to the dihedral angle;

$$\tan\beta = \frac{Vu}{Va} \text{ and } \tan\varphi = \frac{Vr}{Va},$$

$V_r$, $V_u$ and $V_a$ being the components in the radial, tangential and axial directions of the flow:

$$\sin\lambda = \frac{\tan\varphi + \tan\mu + \tan\eta \, \tan\beta}{\sqrt{(1 + \tan^2\eta + \tan^2\mu)(1 + \tan^2\beta + \tan^2\varphi)}}$$

$$\sin\nu = \frac{\sec\varphi \tan\eta - \tan\beta(\sin\varphi + \cos\varphi\tan\mu)}{\sqrt{(1 + \tan\varphi \tan\mu)^2 + (\tan\beta - \tan\varphi\tan\eta)^2 + (\tan\eta - \tan\beta\tan\mu)^2}}$$

If the flow is purely axial, which is approximately the case at the intake of the engine, the sweep angle expresses the tilt of the blade in the axial direction, and the dihedral angle, the tilt of the blade in the tangential direction. A negative sign of the sweep angle expresses a tilt towards the upstream portion, and a positive sign, towards the downstream portion; and a negative sign of the dihedral angle expresses a tilt towards the front side of the blade, and a positive sign, towards the back side of the blade. The tilts are defined from outward radial directions.

FIGS. 4 and 5 illustrate the sweep and dihedral angles respectively from the leading edge (3) of a blade (2) according to the invention, to curves (4) and (5), the other curves being given as an illustration and representing diverse designs of existing blades. The abscissas of the curves represent the values of the angles, and the ordinates the relative values of the radii of the blade (2), from (0%) at the connection to the hub or foot, to (100%) at the free edge or apex (9) of the blade (2). As regards the sweep angle, it is seen that, from the apex to the foot, it is first negative but is continuously increasing, that it becomes positive towards 75% of the height while continuing to increase, that it attains a maximum of about 10° towards 45% in a median area of the blade, and then decreases while remaining positive, attains a minimum of about 4° at about 20% of the height, and then, a foot area having been attained, it again begins to increase continuously, more and more strongly and until it attains a value of about 25° at the connection to the hub (1). While this curve (4) is not necessarily distinct from others between the heights of 100% and 20%, the foot area between the height of 20% and of 0% is clearly original, the other curves either revealing little change in the sweep angle at this location, or on the contrary a decrease of the angle for one of them. An increase in the sweep angle by at least 10° between the ends of the foot area (here 21°=25°−4° approximately) characterizes the invention. A portion 7 of the blade span closest to the hub has sweep angle values greater than the maximum in the median area of the blade. The main effect of the characteristic of the invention is to ensure optimal distribution of the gas flows over the height of the blade (2), which increases the yield and facilitates proper operation of the engine.

FIG. 5 shows that the dihedral angle of the blade (2) is negative close to the free edge, with gradually decreasing values downwards towards the foot, and then decreasing more strongly under a height of about 70% until a minimum (of about −13°) is attained at a height of about 20%; but from this height, the dihedral angle increases towards the connection to the hub (1), and here also increasingly faster, until positive values are attained at a height of about 5% at which a portion 8 of the blade span closest to the hub has positive dihedral angles and a maximum positive angle (of about 8°) at the connection to the hub (1). Here again, the foot area is quite original relatively to the existing designs, which reveal different time-dependent changes in the dihedral angle, but its persistence in all the cases at the negative values and below the one observed at the apex of the blade. An increase in the dihedral angle by at least 10° between the ends of the foot area (here 21°=13°+8° approximately) characterizes the invention. The foot area begins at the inflection of the curve of the relevant angle, and its height may differ for both curves, but it is at most equal to 30% of the total height of the blade (2) approximately. The characteristic profile of the leading edge (3) in the foot region here ensures reinforcement of the blades (2) while maintaining acceptable mechanical stresses at the connection to the hub (1).

Reference is made to FIGS. 6, 7 and 8 which illustrate the blade (2) in views from the side, from the front and from the rear: FIG. 6 gives the possibility of appreciating the influence of the sweep angle, the leading edge (3) being approximately rectilinear in this view in the foot area, and then inflecting so as to form a concavity in the upper regions of the blade; and FIGS. 7 and 8 clearly illustrate the change in direction of the curvature of the leading edge (3) in the foot region, which distinguishes the invention from existing designs discussed here.

The invention claimed is:

1. A one-block bladed disk comprising:
   a hub; and
   blades connected in one-piece to the hub;
   wherein the blades, in a foot area adjacent to the hub and extending over about 20% to 30% of a height of the blade, have a dihedral angle and a sweep angle having values increasing continuously both by at least 10° upon approaching the hub.

2. The one-block bladed disk according to claim 1, wherein the sweep angle and the dihedral angle have values decreasing continuously in a median area of the blade, adjacent to the foot area, upon approaching the hub.

3. The one-block bladed disk according to claim 1, wherein the dihedral angle is always negative, except at a portion of the foot area which is closest to the hub.

4. The one-block bladed disk according to claim 1, wherein the sweep angle has positive values in a median area of the blade, and has greater values than all those of the median area in a portion of the foot area which is closest to the hub.

5. The one-block bladed disk according to claim 4, wherein the sweep angle has a maximum value of at least twice a value the sweep angle has outside the foot area.

6. The one-block bladed disk according to claim 5, wherein the maximum value is at least 20°.

7. The one-block bladed disk according to claim 3, wherein the portion of the foot area extends over 5% to 10% of the height of the blade.

8. The one-block bladed disk according to claim 4, wherein the portion of the foot area extends over 10% to 20% of the height of the blade.

9. A turbine engine, comprising a one-block bladed disk according to claim 1.

10. The turbine engine according to claim 9, wherein the one-block bladed disk forms a compressor fan fnlly upstream from a gas flow through the turbine engine.

* * * * *

UNITED STATES PATENT AND TRADEMARK OFFICE
CERTIFICATE OF CORRECTION

PATENT NO. : 9,677,404 B2
APPLICATION NO. : 14/348770
DATED : June 13, 2017
INVENTOR(S) : Didier Merville et al.

Page 1 of 1

It is certified that error appears in the above-identified patent and that said Letters Patent is hereby corrected as shown below:

On the Title Page

Item (57), Line 1, delete "a" before leading edges.

Item (57), Line 2, insert --angles-- before strongly variable.

In the Specification

Column 2, Line 42, change the term "$V_r$ $V_u$" to --$V_r$, $V_u$--.

In the Claims

Column 4, Line 47, change the term "fnlly" to --fully--.

Signed and Sealed this
Seventh Day of August, 2018

Andrei Iancu
*Director of the United States Patent and Trademark Office*